United States Patent [19]

Inoue et al.

[11] 3,812,327

[45] May 21, 1974

[54] MARK READER

[75] Inventors: Mutsuhiro Inoue, Sagamihara; Kano Tanaka, Tokyo, both of Japan

[73] Assignee: Canon Kabushiki Kaisha, Tokyo, Japan

[22] Filed: Mar. 23, 1973

[21] Appl. No.: 344,288

[30] Foreign Application Priority Data

Mar. 28, 1972 Japan .............................. 47-30954

[52] U.S. Cl. .......................... 235/61.11 E, 250/566

[51] Int. Cl. .......................... G06k 7/10, G08c 9/06

[58] Field of Search ............. 235/61.11 E, 61.11 D; 340/146.3 Z; 250/566, 563

[56] References Cited

UNITED STATES PATENTS

| | | | |
|---|---|---|---|
| 3,286,233 | 11/1966 | Lesueur | 340/146.3 Z |
| 3,309,667 | 3/1967 | Feissel et al. | 340/146.3 Z |
| 3,743,820 | 7/1973 | Willits et al. | 235/61.11 E |
| 3,744,026 | 7/1973 | Wolff | 235/61.11 E |

*Primary Examiner*—Daryl W. Cook

*Attorney, Agent, or Firm*—Fitzpatrick, Cella, Harper & Scinto

[57] ABSTRACT

In order to eliminate error signals produced by presence of scratch, surface flaws or the like on a microfilm, a mark reader circuit is provided. The circuit comprises inverter means, timing means, delay means and comparator means so that only marks for cutting the film or other purposes are read out.

5 Claims, 8 Drawing Figures

MARK READER

BACKGROUND OF THE INVENTION

1. Field of the Invention

The present invention relates to generally a mark reader for detecting the marks marked on a rolled film and more particularly a mark reader which may eliminates the error signal due to the surface defects such as scratches or stains on a rolled microfilm.

2. Description of the Prior Art

In case of using a microfilm as the rolled film, signal marks are generally provided for identification of individual frames or a series of frames on a rolled microfilm in order to cut the rolled microfilm into a predetermined length or to retrieve the desired information. For example in a microfilm cutting device, the signal marks marked along one side edge of a rolled film are detected by a photoelectric cell so that a cutter may be actuated in response to the output signal from the photoelectric cell. In a microfilm selector or information retrieval device the signal marked for individual frames on a rolled microfilm are detected by a photoelectric cell and counted by a counter in order to detect a desired frame. However the photoelectric cell also detects the defects such as scratch, surface flaws or stains on the microfilm so that the error signals are produced. As a result the rolled microfilm is cut at a wrong position or the undesired information is selected.

SUMMARY OF THE INVENTION

One of the objects of the present invention is therefore to overcome the problems or defects encountered in the prior art mark readers.

Another object of the present invention is to provide a mark reader which can detect only the desirable signal marks on a microfilm.

Another object of the present invention is to provide a mark reader which may prevent the erratic detection.

Briefly stated, according to the present invention, the output signal of detecting means for detecting the marks on a film is inverted by an inverter circuit and is cut off by timing means to a predetermined maximum input permission or transmission time when the duration of the output signal is longer than the maximum input permission or transmission time. The output signal of detecting means is also delayed in time by delay circuit means by a time equal to a time delay of the output signal caused by the transmission through the inverter circuit and the timing means. The inverted signal is compared with the delayed signal so that the signal whose duration is shorter than the maximum input permission or transmission time may be eliminated and only the output signal representing the detection of the correct signal mark on the microfilm may be derived.

The above and other objects, features and advantages of the present invention will become more apparent from the following description of the preferred embodiments thereof taken in conjunction with the accompanying drawing.

DESCRIPTION OF THE PREFERRED EMBODIMENTS

Prior to the description of the preferred embodiments of the present invention a prior art mark reader will be briefly described in order to point out the problems and defects encountered therein.

Figure 1:
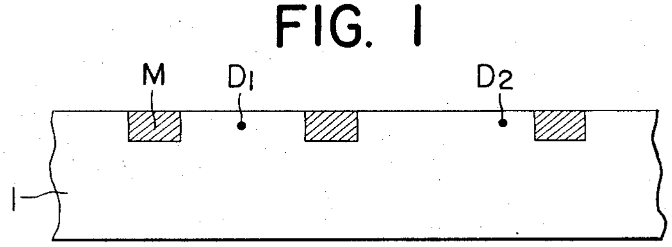
FIG. 1 is a top view of a microfilm having signal marks marked thereupon.
Figure 2:
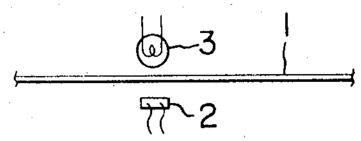
FIG. 2 is a schematic side view of a prior art mark detecting means.
Figure 3A:
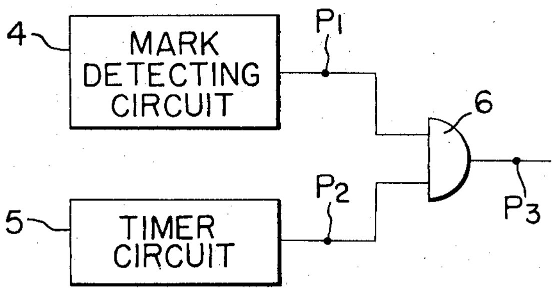
FIG. 3(A) is a block diagram of a prior art mark reader.
Figure 3B:
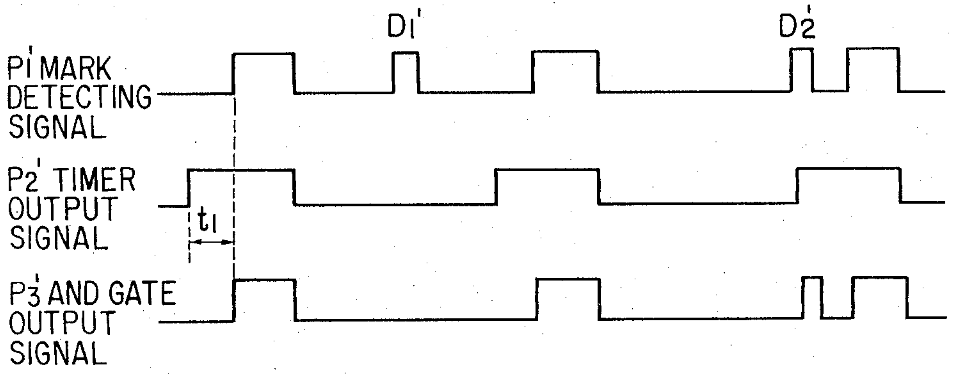
FIG. 3(B) shows the waveforms of the output signals at various points thereof.

The signal marks on the microfilm are for example black and rectangular marks M having predetermined dimensions which are marked along one side edge of a microfilm 1 and spaced apart from each other by a predetermined distance as shown in FIG. 1. When the microfilm 1 is transported between a light source 3 and a photoelectric cell 2 as shown in FIG. 2, the mark M is detected by the latter so that the output signal may actuate a microfilm cutting device or information retrieval may be obtained by counting the signal. In order to prevent a mark reader from detecting the surface defects on the microfilm 1, the prior art mark reader includes a mark detecting circuit 4 and a timer circuit 5 whose outputs are coupled to the inputs of an AND gate 6 as shown in FIG. 3(A). As shown in FIG. 3(B) the output $P_2'$ of the timer circuit 5 must be placed in "on" state in a predetermined time $t$ prior to the detection of the mark M in order to eliminate the error due to the variation in temperature and aging of the circuit. Therefore when the detecting circuit 4 detects the surface defects $D_1$ and $D_2$ on the microfilm 1 within this time $t$, the error signals $D_1'$ and $D_2'$ are produced as shown in FIG. 3(B) and the error detection can not be avoided. Even when the microfilms are stored and handled very carefully, the adhesion of small dusts or the like to the microfilm and the small scratches of the microfilm cannot be avoidable. Therefore when a microfiche cutter may be used as a microfilm cutting device, the error signal disadvantageously causes to cut the rolled microfilm along a wrong cutting line. For the reason, the microfilm is wasted and an additional duplicate must be provided.

Furthermore the prior art mark readers have a common defect that the timer circuit must be adjusted depending upon the types of films such as microfiche, tab cards and so on because the spacing between the adjacent marks is different.

Referring to FIG. 1, a mark reader in accordance with the present invention is used for detecting the marks M marked on the conventional microfilm 1 along one side edge thereof and spaced apart from each other by a predetermined distance. The black marks M have a light transmission different from that of the base of the microfilm 1, and the length and width of each mark M are so selected as to be greater than the dimensions of the surface defects such as dusts, flaws, stains and the like $D_1$ and $D_2$.

Figures 4, 5:
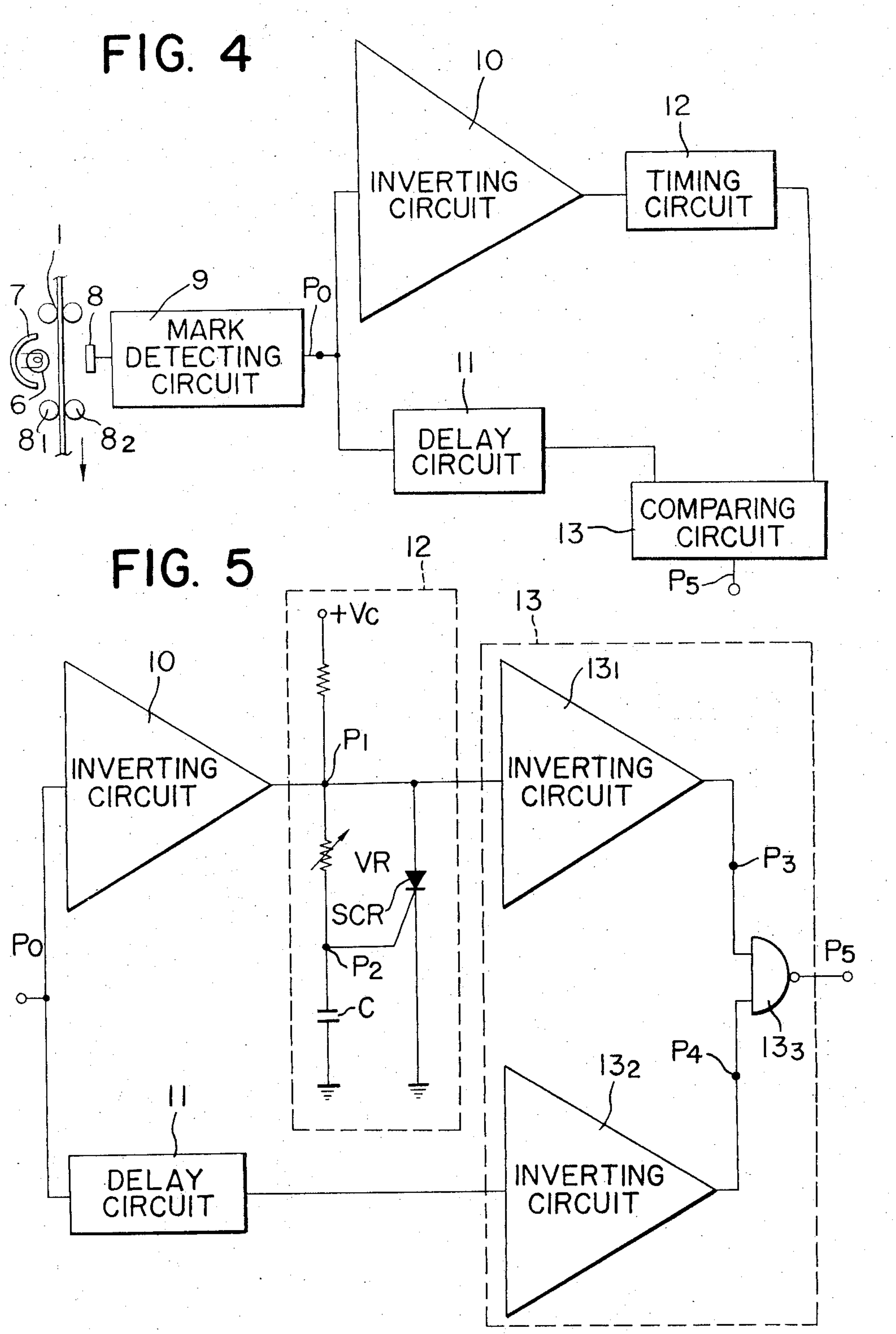
FIG. 4 is a block diagram of a first embodiment of a mark reader in accordance with the present invention.
FIG. 5 is a detailed circuit diagram thereof.

Referring to FIG. 4 the microfilm 1 is transported by a capstan $8_1$ and a pinch roller $8_2$ between a light source 6 and a photoelectric cell 7 such as a phototransistor, a photodiode or the like for detecting the marks M on the microfilm M. The output of the photoelectric cell 7 is applied through a detecting circuit 9 to an inverter circuit 10 and to a delay circuit 11. The signal inverted by the inverter circuit 10 is applied to one input terminal of a comparator circuit 13 through a timing circuit 12 which is adapted to cut the duration of the output signal of the inverter circuit 10 to a predetermined maximum input permission or transmission time. That is, when a correct mark M is detected by the detecting circuit 9, the inverted output signal of the inverter circuit 10 is cut off by the timing circuit 12 into a signal whose duration is slightly shorter than the duration of the detected mark M. The output signal of the detecting circuit 9 applied to the delay circuit 11 is delayed by a time equal to a time delay of the signal caused by the transmission through the inverter circuit 10 and the timing circuit 12 so that the output signals of the timing circuit 12 and the delay circuit 11 may be simultaneously applied to the comparator circuit 13.

When a correct signal mark M is detected the output signal is derived from the comparator circuit 13, but when an error signal due to a surface flaw or stain is detected the duration of the signal derived from the timing circuit 12 is shorter than the maximum input permission or transmission time so that the inverted signal, the duration of which has not been cut by the timing cuircuit is applied to the comparator circuit 13 and is compared with the output signal transmitted through the delay circuit 11 to the comparator circuit 13. In this case no signal is derived from the comparator circuit 13 so that the error signal may be eliminated.

Next referring to FIG. 5, the mark reader of the present invention will be described in more detail. The output terminal Po of the detecting circuit 9 is connected to the input terminals of the inverter circuit 10 and the delay circuit 11. The timing circuit 12 comprises a variable resistor VR and a capacitor C which form a charging circuit and a thyristor SCR which is conducted when the voltage across the capacitor C reaches a predetermined level, thereby intterupting the application of the output signal of the inverter circuit 10 to the comparator 13. A positive DC supply Vc is connected to the variable resistor VR, and the maximum input permission or transmission time may be controlled by the variable resistor VR.

The comparator circuit 13 comprises a first inverter $13_1$ to which is applied the output signal of the timing circuit 12, a second inverter $13_2$ to which is applied the output signal of the delay circuit 11, and a NAND gate $13_3$ to which are applied the outputs of the first and second inverters $13_1$ and $13_2$.

Figure 6:
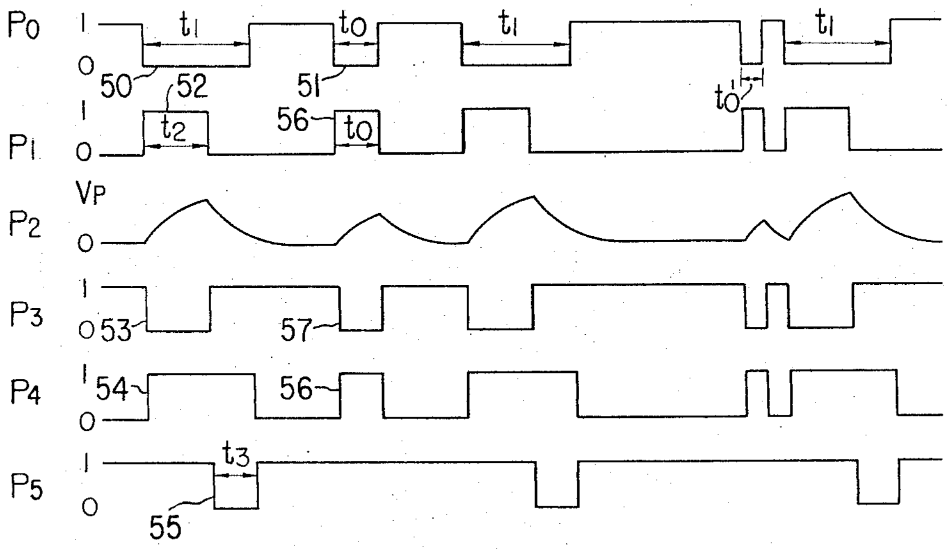
FIG. 6 shows the waveforms of the output signals at various points thereof.

FIG. 6 shows the waveforms of the signals at various points in the circuit shown in FIG. 5. It is assumed that the output signal of the photoelectric cell 8 rises when the leading edge of the mark M is detected and falls when the trailing edge of the mark M is detected. Whenever the mark M is detected the output signal 50 with a duration $t_1$ appears at Po in FIG. 6, but when a surface flaw or stain D is detected, an error signal 51 with a duration $t_0$ considerablly smaller than the duration $t_1$ appears.

The signal 50 with a duration or period $t_1$ is inverted by the inverter circuit 10, and the output signal of the inverter circuit 10 charges the capacitor C in the timing circuit 12. After time $t_2$ which is dependent upon the resistance of the variable resistor VR and the capacitance of the capacitor C and which is a maximum input permission or transmission time, the voltage across the capacitor C reaches a triggering voltage $V_p$ of the thyristor SCR so that the latter is conducted. As a result, the application of the inverted signal to the inverter $13_1$ is immediately cut off. That is, the signal 52 with a duration or period $t_2$ shown at $P_1$ in FIG. 6 is applied to the inverter $13_1$ so that the latter gives the output signal 53 shown at $P_3$ in FIG. 6. The output signal of the delay circuit 11 is inverted as shown at $P_4$ in FIG. 6 by the inverter $13_2$. These inverted signals 53 and 54 are applied to the NAND gate $13_3$ so that the output signal 55 with a duration $t_3$ may be derived as shown at $P_5$ in FIG. 6.

The error signal 51 with a duration $t_0$ is inverted by the inverter circuit 10 into the signal 56 with a duration $t_0$. The signal 56 charges the capacitor C in the timing circuit 12, but since its duration $t_0$ is shorter than the time duration $t_1$ the voltage across the capacitor C cannot reach the triggering voltage $V_p$ of the thyristor SCR before the signal 56 disappears so that the thyristor SCR is not conducted. Therefore the output signal 52 of the inverter $13_1$ has the same duration or period $t_0$. The inverter $13_2$ to which is applied the output signal of the delay circuit 11 gives the signal 58 with a duration $t_0$. That is, the signals 52 and 58 applied to the NAND gate $13_3$ are opposite in polarity but have the same duration so that they are cancelled by each other. Therefore the NAND gate $13_3$ gives no output signal as shown at $P_5$ in FIG. 6. In other words, the error signal is eliminated.

So far the mode of operation of the mark reader has been described as detecting the black signal marks on the transparent base of the microfilm, but it will be understood that the mark reader may be also used for detecting the transparent signal marks on the opaque base of the microfilm.

Figure 7:
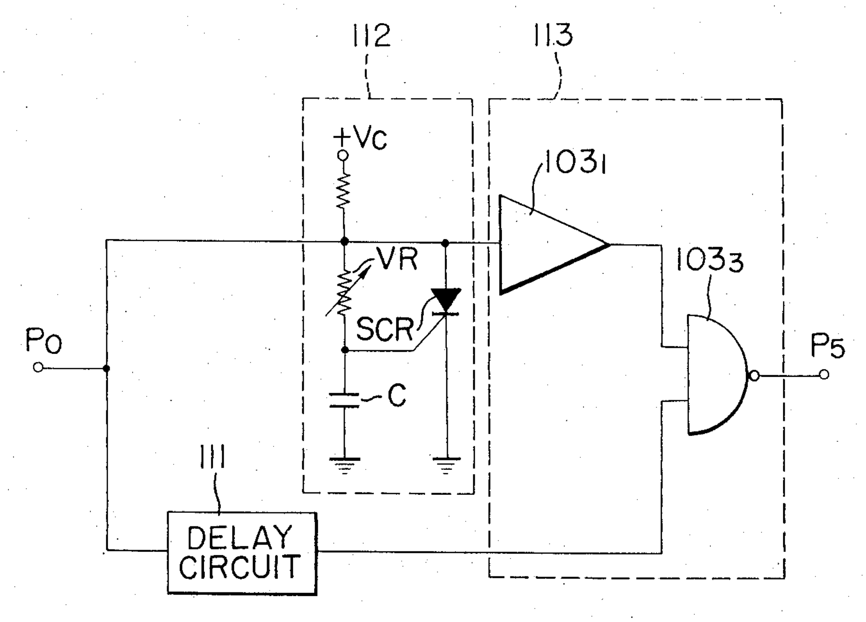
FIG. 7 is a block diagram of a second embodiment of the present invention.

FIG. 7 shows a circuit diagram of a mark reader of the present invention adapted to detect the transparent signal marks on the opaque base of the microfilm. The component parts similar to those shown in FIG. 5 are designated by the same reference characters and by reference numerals added by 100. The circuit shown in FIG. 7 is different from the circuit shown in FIG. 5 in that the inverter circuits 11 and $13_2$ are eliminated. When the correct signal mark is detected, the output signal is derived from the comparator 113, but when the error signal due to the surface flaw or strain on the microfilm is detected, no output signal is derived from the comparator circuit 113. Therefore the erratic operation may be completely eliminated.

In both of the embodiments described above with reference to FIGS. 5 and 7 the actuating time or the maximum input permission time $t_2$ of the timing circuit 12 may be controlled by the variable resistor VR in consideration of the duration $t_1$ of the signal representing the correct signal mark M and the duration $t_0$ of the error signal due to the effect on the microfilm. It is preferable to operatively couple the variable resistor VR to means for controlling the speed of transportation of microfilm so that the maximum input permission or transmission time $t_1$ of the timing circuit 11 may be varied in response to the variation in microfilm transportation speed.

The output signal derived from the comparator circuit 13 or 113 may be applied to a counter in a microfiche cutter or in a microfilm selector.

As described above, the mark reader in accordance with the present invention is very simple in construction and compact in size yet capable of eliminating the error signal due to the defect such as surface flaw or stain on the microfilm. Furthermore even the signal marks which are not spaced apart from each other by the same distance may be correctly detected without the adjustment of the mark reader.

We claim:

1. A mark reader for reading the marks marked on a film in spaced apart relation when said film is transported, comprising a. means for transporting the film to a mark detecting position, b. means for illuminating the marks on the film, c. means for detecting the marks illuminated by said illuminating means and producing the detected signal, d. timing means for cutting the duration of the output signal of said detecting means to a predetermined maximum input permission or transmission time when the duration of the output signal is longer than said maximum input permission or transmission time, and e. comparator means for comparing the output signal of said timing means with the output signal of said detecting means, whereby the output signal of said detecting means which is shorter than said maximum input permission or transmission time may be eliminated and only the signal representing the detection of the signal mark may be derived from said comparator means.

2. A mark reader as defined in claim 1 wherein said timing means comprises a. a charging circuit comprising a variable resistor and a capacitor which is adapted to be charged by the output signal of said detecting means, and b. a thyristor adapted to be conducted when the voltage across said capacitor in said charging circuit reaches a predetermined level thereby cutting off the output signal of said detecting means; and said comparator circuit comprises a gate circuit to which are applied the output signals from said timing means and said detecting means so that when said output signals coincide with each other said gate circuit outputs the output signal.

3. A mark reader as defined in claim 1 wherein an inverter circuit is inserted between said detecting means and said timing means for inverting the output signal of said detecting means.

4. A mark reader as defined in claim 3 wherein said comparator means comprises a first inverter for inverting the output signal of said timing means, a second inverter for inverting the output signal of said detecting means, and a gate circuit to which are applied the output signals of said first and second inverters so that only when said output signals coincide with each other said gate circuit gives the output signal.

5. A mark reader as defined in claim 1 wherein said comparator means comprises an inverter for inverting the output signal of said timing means, and a gate circuit to which are applied the output signals of said first and second inverters so that only when said output signals coincide with each other said gate circuit gives the output signal.

* * * * *